March 22, 1966   J. L. RUSSELL   3,242,484
TOPOGRAPHIC MAPPING SYSTEM EMPLOYING REFLECTED ENERGY
Filed Sept. 23, 1963   4 Sheets-Sheet 1

JAMES L. RUSSELL
INVENTOR

BY Killman, Smith & Lamb
ATTORNEYS

March 22, 1966  J. L. RUSSELL  3,242,484
TOPOGRAPHIC MAPPING SYSTEM EMPLOYING REFLECTED ENERGY
Filed Sept. 23, 1963  4 Sheets-Sheet 2

JAMES L. RUSSELL
INVENTOR

BY Tillman, Smith & Lamb
ATTORNEYS

March 22, 1966   J. L. RUSSELL   3,242,484
TOPOGRAPHIC MAPPING SYSTEM EMPLOYING REFLECTED ENERGY
Filed Sept. 23, 1963   4 Sheets-Sheet 3

JAMES L. RUSSELL
INVENTOR

BY Killman, Smith & Lamb
ATTORNEYS

March 22, 1966     J. L. RUSSELL     3,242,484
TOPOGRAPHIC MAPPING SYSTEM EMPLOYING REFLECTED ENERGY
Filed Sept. 23, 1963     4 Sheets-Sheet 4

JAMES L. RUSSELL
INVENTOR

United States Patent Office 3,242,484
Patented Mar. 22, 1966

3,242,484
TOPOGRAPHIC MAPPING SYSTEM EMPLOYING REFLECTED ENERGY
James L. Russell, York, Pa., assignor to The Bendix Corporation, York, Pa., a corporation of Delaware
Filed Sept. 23, 1963, Ser. No. 310,692
11 Claims. (Cl. 343—5)

The present invention relates to ranging and direction finding systems of the echo type. More particularly, it relates to radar, sonar or similar exploratory or surveillance systems in which the location and elevation of objects are displayed in the form of a relief map.

The invention may be applied to particular advantage in terrain recognition systems used for automatically navigating a vehicle or it may be employed for surveying unfamiliar terrain under conditions unfavorable to visual observation. A cross-country automotive vehicle cannot be driven in darkness, fog, or even if the terrain is highly illuminated when the circumstances destroy the normal visual preception of the observer. In the desert, for example, the contrast between brilliantly illuminated objects and shaded objects is often so great that the human eye cannot accommodate the difference in levels. Then a shaded obstruction will not be visible or the depth of a depression cannot be judged. Even more striking are the problems which would be encountered in exploring the surface of the moon. Due to the lack of an atmosphere, there is no diffusion and scattering of light as on earth and therefore shaded objects are totally invisible. Even the provision of supplemental illumination by headlights or spotlights would be of little benefit according to present theories. The physiological processes of depth perception are not well understood, but it is believed that an observer's assessment of a situation depends, in part, upon familiarity with the size and shape of the viewed objects and their surroundings, as well as their reflectance, texture and gradation. Whatever mechanism is involved, it is certain that the conditions of illumination encountered on the moon would be totally different from anything in human experience. It is presently unknown, of course, whether visual perception upon the moon would be adequate or whether the physiological process would adapt itself to the changed circumstances sufficiently to enable a human to rely to the same degree in his sense of sight as if he were upon earth.

One object of the present invention is to provide a system of substituted vision which enables selenic and mundane travellers alike to proceed with confidence under extremely poor conditions of visibility.

The prior art suggests conventional search radar with information display in the form of a plan position indicator (PPI) as a means for overcoming adverse visibility conditions. Such systems have proven effective for navigating ships but there are favorable circumstances at sea which do not exist on the land. A ship is always travelling on a level surface, disregarding waves, and except that it be close inshore, need have no fear of obstacles in any chosen course. Any radar returns can therefore be regarded as hazards to be avoided. Terrestrial travel is very different. A clear path cannot be indicated on land by conventional radar because essential information relating to the elevation of reflecting objects is not supplied. The addition of height finding apparatus to conventional azimuth search gear is not a satisfactory solution because the number of components is practically doubled and the information is separately displayed in a form difficult to interpret. A further disadvantage of conventional radar is the very high rate at which information must be processed.

Ordinarily, a radar must be capable of indicating a target anywhere within range. If the resolution is not to be seriously compromised, the video bandpass must be approximately that given by the relationship $0.6/T$, where $T$ is the pulse length. Translated to numbers useful in a system for terrestrial exploration, say a range resolution of 1 foot, with a maximum range of 1,000 feet, the video bandpass required is 300 megacycles. This result follows from the fact that the stipulated resolution demands a pulsewidth no greater than 0.2 nanosecond. Such a demand for bandpass strains the limits of the art. Furthermore, because much of the information available would not be used, it is a wasteful encumbrance that not only complicates a system locally operated, but virtually precludes relaying the information to remote point.

One object of the present invention is to provide a mapping radar capable of presenting all of the information which can be effectively used within a passband very much reduced from that required in systems existing heretofore.

Another object of the invention is to provide a mapping radar in which information concerning the terrain surveyed may be relayed to a remote point using only a modest band of signal frequencies.

Still another object is to provide a radar in which the bearing, range and elevation of objects is presented simultaneously upon a single indicator.

Briefly, the invention comprises a radar in which the return from a reflecting object is compared with an anticipated return from a reference surface. The error signal resulting from the comparison is utilized to alter the deflection and beam intensity of a cathode ray tube indicator or is relayed for remote interpretation. Since the error signal alone need be processed, information rates and signal frequency bands are very much lower than would be required of prior systems.

Figure 1:
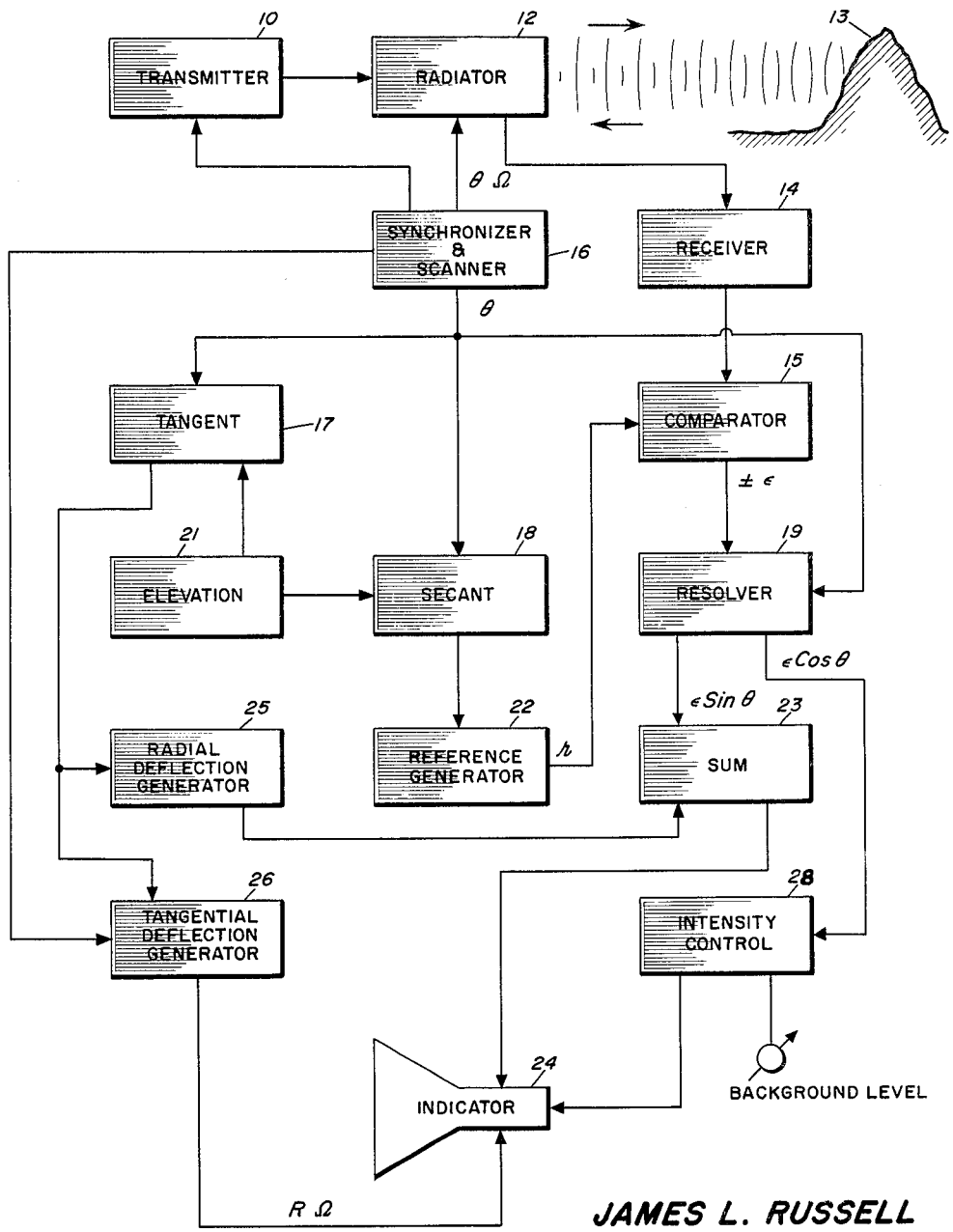
FIG. 1 is a functional block diagram of the invention.

FIG. 1 is a block diagram of the system of the invention. In common with prior systems, a transmitter 10 generates pulses of energy which are launched in the form of a narrow beam by a radiator 12. If the transmitter 10 generates radio frequency electromagnetic energy, the radiator 12 may comprise any suitable directive antenna. Since the transmitter 10 may alternatively comprise a generator of coherent visible light or acoustical energy, the radiator 12 is not necessarily an antenna but may comprise an optical or acoustical lens system. It will be assumed, however, that high frequency electromagnetic energy is being radiated.

Energy from the radiator 12 is propagated towards a distant object 13, whence it is returned as an echo to the radiator. By means of a duplexer, not shown, the radiator 12 serves both for transmission and reception. The received echoes are amplified and converted to video frequency pulses in a receiver 14, the output of which is applied to a comparator 15. The comparator 15 determines the elevation of the reflecting object 13 by means more fully disclosed hereinafter.

Figure 2:
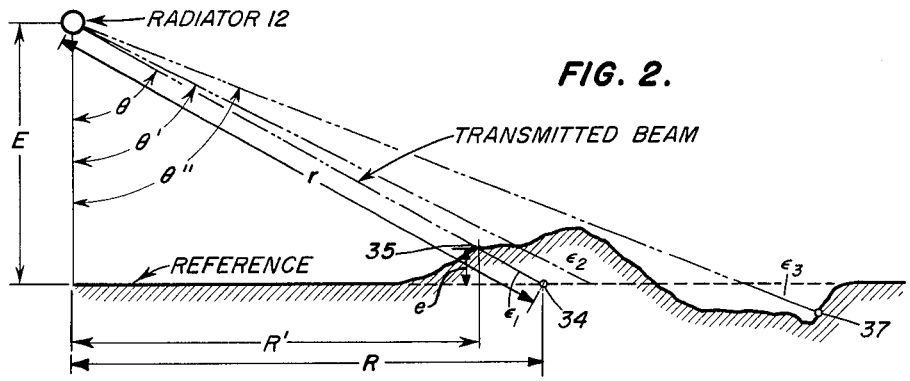
FIG. 2 is a sketch of a topographic section illustrating the geometry applied to the invention and the vertical scan motion of the beam from the system transmitter.
Figure 3:
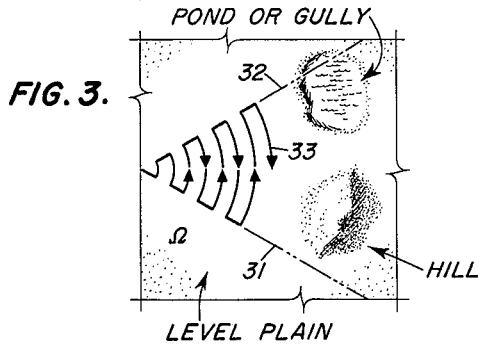
FIG. 3 is a sketch of a topographic plan illustrating the locus of the transmitter beam for one form of sector scan.

The radiator 12 is mechanically or electronically steered through a predetermined scanning pattern under the control of a synchronizer and scanner 16. FIGS. 2 and 3 illustrate a form of sector scan suitable for the purposes of the invention. The radiator 12 is elevated above the surface to be surveyed, as is apparent in FIG. 2. The radiator 12 initially depresses the beam very nearly to the vertical and sweeps it through the sector bounded by the radii 31 and 32. As the beam reaches each of the bounding radii, the depression angle $\theta$ is increased by a small increment. Thus, a scanning pattern 33 is generated in which circular arcs of the terrain are illuminated at successively increased increments of range.

Referring particularly to FIG. 2, a cross-section of the terrain along a particular range radius is shown. The transmitted beam appears at positions corresponding to depression angles $\theta$ and $\theta'$. A level reference surface is assumed from which the elevation E of the radiator is measured. For each value of the beam depression angle $\theta$, the slant range from the radiator to the reference surface can be readily computed and is known. Elevations or depressions in the terrain will cause an echo to be returned earlier or later than an echo returning from the reference plane. Therefore, the elevation of reflecting objects relative to a reference plane can be determined by comparing the time of arrival of the echo from the object with the anticipated time of arrival of an echo from the reference surface.

As is evident from FIG. 2, the slant range $r$ from the radiator to point 34 on the reference surface is (1)
$$r = \frac{E}{\cos \theta} = E \text{ secant } \theta$$

and the actual range R is (2) $$R = E \tan \theta$$

The elevation of point 35 above the reference surface causes an echo to travel a smaller distance than the slant range $r$. The difference between the distance to the actual surface and the slant range to the reference surface is designated $\epsilon_1$. The elevation $e$ of point 35 above the reference is (3) $$e = \epsilon_1 \cos \theta$$

and the actual range R' is (4) $$R' = R - \epsilon_1 \sin \theta$$

If the terrain declines from the reference surface, as at point 37, the echo from the actual surface will travel a distance greater than the slant range computed to the reference surface. Declivities are recognizable by the arrival of the return later than the time anticipated for a return from the reference surface. The sense of the error $\epsilon$ must therefore be regarded in calculating the elevation $e$ and actual range R' by Equations 3 and 4.

The means for computing and displaying the elevation of the terrain will now be described, with reference again to FIG. 1. The depression angle $\theta$ is communicated as a shaft position to a tangent function generator 17, a secant function generator 18, and a resolver 19. A fixed voltage from a source 21 having a magnitude proportional to the elevation E of the radiator is applied to generators 17 and 18, thus providing output voltages proportional to the actual range R and the slant range $r$ to the reference surface. The output of secant generator 18 enters a reference generator 22 which provides an enabling signal to comparator 15 after a time delay equal to the time required for a transmitted pulse to travel to and be reflected from the reference surface. Comparator 15 determines the time interval between the reception of a video pulse from receiver 14 and the enabling signal from reference generator 22 and further establishes whether the video pulse arrived earlier or later than the enabling signal. An output signal proportional to $\epsilon$, the error in slant range, is thus provided. The error signal is passed through resolver 19 providing the vector components $\epsilon \cos \theta$ and $\epsilon \sin \theta$ which are respectively combined with the intensity control bias in the intensity control 28 and with the horizontal deflection voltage in a summing circuit 23. The outputs of intensity control circuit 28 and summing circuit 23 are applied to appropriate electrodes of a cathode ray tube indicator 24. The cathode ray beam of indicator 24 is deflected in accordance with the scan pattern of FIG. 3 by the outputs of a radial deflection generator 25 and a tangential deflection generator 26. The summing circuit 23 solves Equation 4 to provide a radial deflection of the beam of indicator 24 proportional to the range R' to the actual surface. Elevations of the terrain above the reference surface therefore result in movement of the beam trace towards the origin of the indicator scan pattern while a declivity causes the trace to move outwards from the origin.

Figure 4:
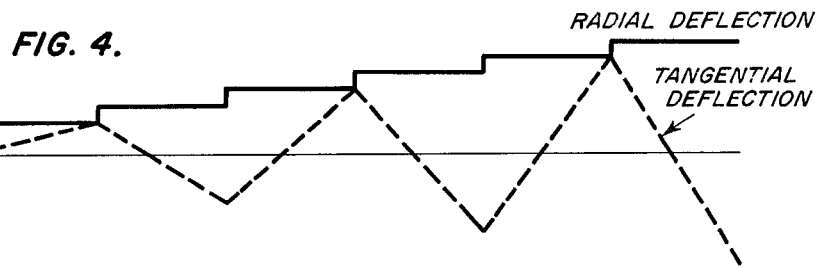
FIG. 4 is a waveform diagram for vertical and horizontal generators producing the scan motion shown in FIGS. 2 and 3.

FIG. 4 illustrates the waveforms of the outputs of deflection generators 25 and 26. The output of radial deflection generator 25 is a rising staircase form with each step representing an incremental increase in the scan deflection angle $\theta$. This form of deflection applied along the radial deflection axis of indicator 24 causes the position of the cathode ray beam to move from left to right in proportion to the range R to the reference surface, found by solving Equation 2.

The tangential deflection waveform is triangular with a cyclically increasing amplitude corresponding to the increments in the scan depression angle $\theta$. This waveform is generated by solving Equation 2 for R, the range to the reference surface and multiplying the result by the scan angle $\Omega$. When applied to the indicator 24, the position of the cathode ray beam will be deflected tangentially to the radial axis producing the arcuate traces 33 of FIG. 3.

The intensity control 28 is adjusted to produce an illumination at the face of indicator 24 approximately midway between black and full brightness, with no signal applied from resolver 19. This background illumination represents the elevation of the reference plane. Departures in the terrain from the reference elevation are then indicated by increasing the light output of indicator 24 for higher elevations and reducing the light for lower elevations.

Figure 5:
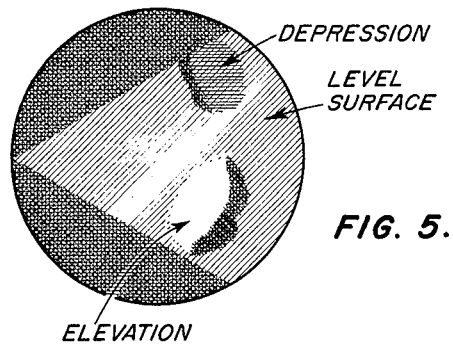
FIG. 5 is a representation of the appearance of the system indicator when displaying the topographic features shown in FIG. 3.

FIG. 5 illustrates the representation of the terrain shown pictorially in FIG. 3 upon the indicator 24. The elevation of prominences is judged by the level of brightness above the background while depressions appear as darker portions of the tube face. Such a presentation does not yield quantitative data of the elevation of the terrain even though the information is available at the output of resolver 19. The presentation is adequate, however, to enable an operator to select a safe course of maneuver since usually it is only necessary to know that a pit exceeds a certain depth or that a cliff or bank exceeds a certain height to recognize the departure as an obstacle. Means are disclosed hereinafter for quantizing the elevation data so that it may be relayed through a limited bandwidth communications channel for processing and utilization in any desired maneuver. Such remote use might include plotting the data in the form of a contour map which would, of course, yield information of a less subjective nature.

Figure 6:
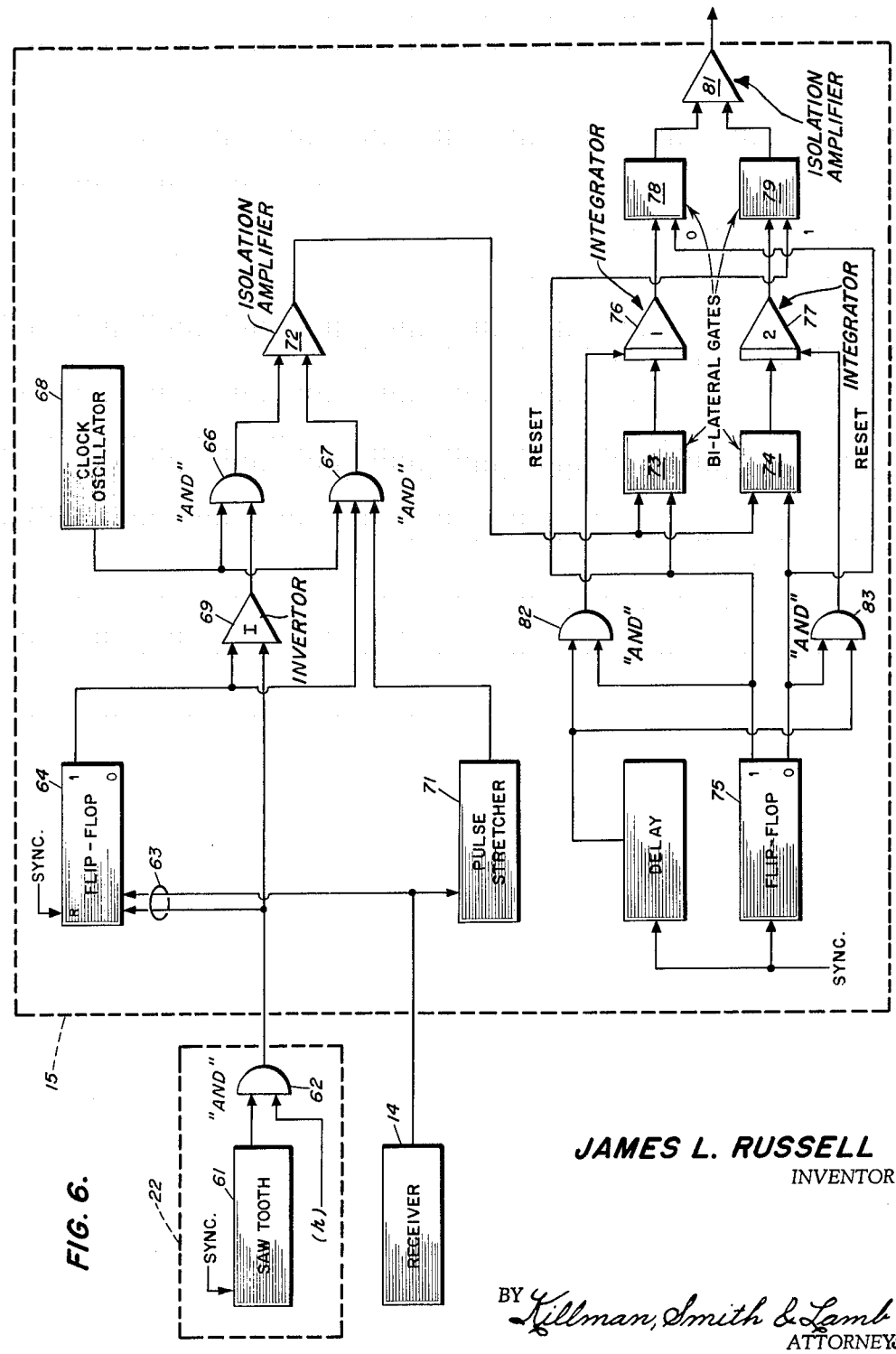
FIG. 6 is a block diagram illustrating the elements of the comparator and reference generator blocks of FIG. 1.

FIG. 6 illustrates details of the circuits of comparator 15 and reference generator 22. Reference generator 22 comprises a sawtooth wave generator 61 and an "and"

gate 62. The output of generator 61 is a voltage which increases linearly with time. The maximum amplitude of the sawtooth wave corresponds to the maximum range voltage output of secant generator 18 and the rise time is equal to the time required for a pulse to be transmitted and reflected from maximum range. When a pulse is transmitted, a synchronizing pulse triggers an output from sawtooth generator 61 which rises towards equality with the range voltage from secant generator 18. At that point an enabling signal is passed by "and" gate 62 to the input 63 of a flip-flop 64. The synchronizing pulse resets flip-flop 64 to produce a signal from the "zero" output at the commencement of each pulse transmission. With a "zero" output from flip-flop 64 neither of a pair of subsequent "and" gates 66, and 67 can conduct. The video output of receiver 14 is also applied to the input 63 of flip-flop 64. Th earliest input to flip-flop 64 from either reference generator 22 or receiver 14 triggers the flip-flop into a "one" condition. The later input from either of the input sources returns the flip-flop to a "zero" condition. Thus flip-flop 64 supplies an enabling signal only during the interval of time separating the anticipated time of arrival of a pulse from the reference surface and the time of arrival of the pulse reflected from the actual surface.

Referring briefly again to FIG. 2, a pulse from elevated point 35 would appear at the output of receiver 14 prior to an output from "and" gate 62. The time separating the pulse from the receiver and the output of the gate is representative of the slant range error $\epsilon_1$. For the depressed point 37, the position of the pulses is reversed, with the first output appearing from reference generator 22. It is only required therefore to determine the time during which flip-flop 64 is in a "one" condition, and the order of application of inputs to flip-flop 64 in order to determine the magnitude and direction of the departure of the terrain from the reference surface.

Again referring to FIG. 6, a stable clock oscillator 68 provides a nalternating wave to both "and" gates 66 and 67. "And" gate 67 is connected to pass only positive polarity signals, while "and" gate 66 passes the negative portion of the clock wave. The "one" output of flip-flop 64 and the output of reference generator 22 are applied through an inverter 69 to negative "and" gate 66. The vidieo output of receiver 14 is passed through a pulse stretcher 71 to "and" gate 67 which also receives the "one" output of flip-flop 64. Thus if a pulse appears from receiver 14 prior to an output from "and" gate 62, gate 67 will be enabled for the duration of the "one" output from flip-flop 64 and pass positive clock pulses, the number of which is a measure of the slant range error $\epsilon$. If an output first occurs from "and" gate 62, negative "and" gate 66 is enabled, passing negative clock pulses equal in number to the slant range error. The output of gate 66 or 67, whichever may be conductive is the quantized slant range error.

It is at this point that the advantages of the invention in conserving signal bandwidth may be appreciated. The error is permitted to saturate. That is, limits are fixed upon the error to be measured. The time of the expected arrival of a pulse is a known quantity and the maximum departure from this time is fixed by the limits placed upon the error. Further, the duration of measurement of error is small compared to the interval during which no information is being received. It is therefore possible to use the "no information" time to transmit or utilize the information gathered within the short measurement period. By way of example suppose it were desired to know the elevation of objects within 1 foot to a maximum of $\pm 20$ feet out to a maximum range of 1,000 feet. The ratio of "information" to "no information" time is $20/1000$. The information can therefore be relayed or utilized locally at a rate fifty times slower than the rate at which the information was gathered.

Continuing with reference to FIG. 6, means will now be described permitting substantially the whole pulse repetition period to be used for generating the display on indicator 24 (FIG. 1). The outputs of gates 66 and 67 are passed through an isolation amplifier 72 to a pair of bilateral gates 73 and 74 capable of conducting either positive or negative polarities upon their enablement. Gates 73 and 74 are enabled during alternate pulse repetition periods by the "one" and "zero" outputs of a scale of two countdown flip-flop 75. Flip-flop 75 is triggered by the synchronizing pulse which initiates each pulse radiated by the transmitter 10. The signals conducted by gates 73 and 74 are thence applied through a second pair of bilateral gates 78 and 79 and an isolation amplifier 81 to resolver 19 (FIG. 1). Gates 78 and 79 are enabled in antiphase relationship to the enablement of gates 73 and 74 by applying the enabling signals from flip-flop 75 oppositely from their application to gates 73 and 74. Integrator 76 is reset simultaneously with the enablement of gate 73 by the application of the synchronizing pulse, delayed to permit transition of flip-flop 75, to an "and" gate 82. Gate 82 is enabled by a "one" output from flop-flop 75, passing the synchronizing pulse to reset integrator 76. By similar means including an "and" gate 83, integrator 77 is reset simultaneously with the enablement of gate 74.

Figure 7:
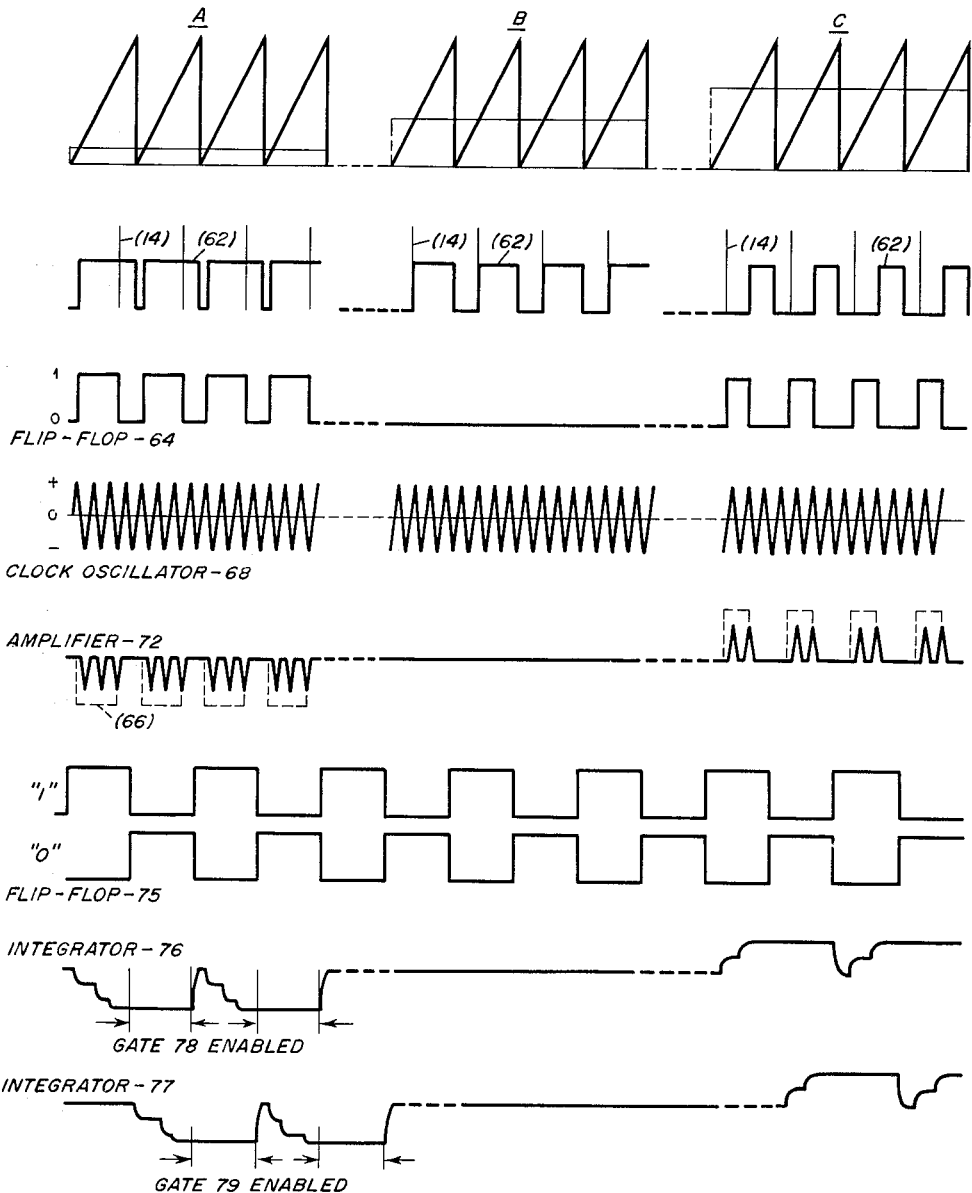
FIG. 7 is a diagram of waveforms in the comparator of FIG. 6.

The operation of the comparator information storage and retrieval circuit will be described with reference to the waveform diagrams of FIG. 7. These diagrams are intended only to illustrate events; the periods of the waves in several cases have been modified to simplify illustration. In FIG. 7, the output of sawtooth generator 61 is superimposed upon the output of secant generator 18. Three scans A, B and C are shown for different ranges. Gate 62 is enabled during the time the amplitude of the sawtooth exceeds the magnitude of the range voltage $r$ from secant generator 18. The output of receiver 14 is shown superimposed on the output of gate 62. At range A, gate 62 is enabled prior to the reception of an echo, indicating that the terrain is lower than the reference surface at that point. At range B the terrain is level with the reference surface, while at C the terrain is higher than the reference. The possibility of an ambiguous triggering of flip-flop 64 by the simultaneous application of a receiver output and reference generator output, as at range B, may be eliminated by including a logic circuit in the flip-flop as shown in FIG. .

At range A, flip-flop 64 is triggered on by an output from reference generator 22 enabling "and" gate 66 to pass negative clock pulses through amplifier 72. At range C, flip-flop 64 is triggered on by an output from receiver 14, enabling gate 67 to pass positive clock pulses through amplifier 72. "One" outputs of flip-flop 75 enable bilateral gate 73. Clock pulses passed by amplifier 72 will then accumulate in integrator 76. Upon disablement of gate 73, integrator 76 retains the charge accumulated during the preceding conducting cycle of the gate. The constant integrator output occurring during this interval is applied by enabled gate 78 to amplifier 81 for utilization. Information is similarly accumulated and retained in integrator 77 in alternation with integrator 76. During the interval that enabled gate 73 is passing information to integrator 76, enabled gate 79 is transmitting stored information from integrator 77. Thus one pulse repetition period is employed to accumlate information, while the whole of the succeeding pulse repetition period is employed to transmit the accumulated information. The bandwidth required for the transmission and display of information is dependent upon the pulse repetition period, rather than upon the resolving power of the system. As previously noted, a marked reduction in the bandwidth of the information transmission circuits is thereby permitted.

If it is desired to relay the information to a remote point, integrators 76 and 77 may be replaced by register. The registers accumulate a count of clock pulses passed by amplifier 72 in the same sequence of events applying to the accumulation of the pulses by the integrators. The registers, however, will retain the output of amplifier 72 in digital form, so that the count may be relayed by any of several known methods of data transmission, for example by a pulse code modulation system. A whole pulse repetition period is available for the transmission of the count held by a register, so that the same bandwidth reduction is possible in relay operations as exists for local operation.

Figure 8:
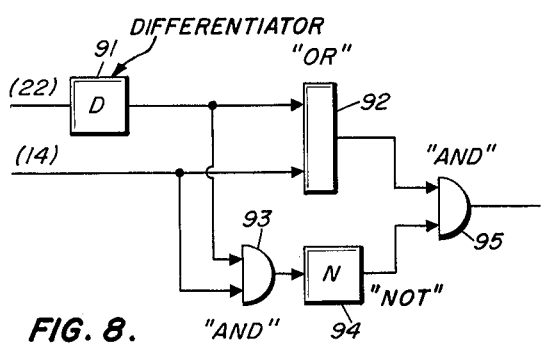
FIG. 8 is a block diagram of a logic circuit useful with the circuit of FIG. 6.

FIG. 8 illustrates a logic circuit for preventing the ambiguous triggering of flip-flop 64 which might occur when the terrain is level with the reference surface. The logic is designed to pass a trigger input to the flip-flop from receiver 14 or reference generator 22, but not from both simultaneously. The output of reference generator 22 is differentiated in a network 91 so that only the leading edge of the generator output pulse will be applied to the logic. The differentiated output of generator 22 and the output of receiver 14 are supplied to an "or" gate 92 and an "and" gate 93. "And" gate 93 is connected through a "not" gate 94 to a second "and" gate 95. "Not" gate 94 supplies an enabling signal to "and" gate so long as there is no output from "and" gate 93. Therefore, an output from generator 22 or receiver 14 can pass through "or" gate 92 and "and" gate 95 to trigger flip-flop 64. When an output from receiver 14 coincides with the leading edge of the pulse from generator 22, however, "and" gate 93 will conduct, causing "not" gate 94 to remove the enabling signal to gate 95. Flip-flop 64 will not then be trigged.

Obviously many modifications and variations of the present invention are possible in the light of the above teachings. The invention may therefore be practiced otherwise than as specifically disclosed without departing from the scope of the appended claims.

The invention claimed is:

1. A topographic mapping system for determining the contours of a surface relative to a datum plane comprising, means for determining the radial range from a mapping station to a point on said surface, means providing the difference between said range and the distance along the radius to a point on a reference datum plane, means resolving said difference into components perpendicular to and parallel with said datum plane, and means receiving said components for indicating the position of said point on said surface with respect to said point on said plane.

2. A mapping system for determining the contours of a surface, comprising means for projecting a beam of energy along known coordinates toward said surface, means providing a timing signal indicative of the anticipated time of arrival of a reflection of said beam from a point on said surface coinciding with a point on a reference surface, means comparing the arrival time of a reflection of said beam with said timing signal to provide an error signal indicative of the elevation of said surface relative to said reference surface, means for scanning said surface with said beam to provide a plurality of said error signals each identified with particular coordinates, and means for plotting said error signals to provide an indication of the contours of said surface relative to said reference surface.

3. A mapping radar comprising a transmitter for generating pulses of energy, a radiator for scanning the surface to be mapped with pulses from said transmitter, a receiver connected to said radiator to receive the returns of said radiated pulses, a reference generator synchronized with said transmitter to provide a signal at an anticipated time for a return from said surface, means providing a signal proportional to the difference between the time of reception of an actual return and the time of an anticipated return, and means for processing said difference signal during the interval separating pulse transmissions.

4. A system for reducing the rate of transmission and utilization of data in a radar, comprising means for repetitively transmitting pulses of energy, the interval between pulses determining the maximum range of the radar, means providing a data signal representative of a fractional part of the maximum range of the radar, at least a pair of storage means, one of which is operative to store a data signal simultaneously with the acquisition of said data, the other of which is operative at that time to transmit, during an entire interval between pulses, a data signal previously stored therein; and means for utilizing data from the transmitting one of said storage means.

5. A system for reducing the rate of transmission and utilization of data in a radar, comprising means for repetitively transmitting pulses of energy;

means for receiving reflections of said transmitted pulses during the interval separating successive transmitted pulses;

means producing data signals from said received pulses;

at least a pair of storage means;

means applying successive data signals alternately to said storage means; and means for utilizing data from alternate ones of said storage means during substantially the entire interval separating successive transmitted pulses and for clearing the utilized storage means at the end of said interval, said utilizing means operating reciprocally with said data applying means to provide for utilization of a previously stored data signal from one of said storage means during storage of a currently occurring data signal in the other of said storage means.

6. A mapping system for determining the contours of a surface, comprising means for projecting pulses of energy along known coordinates toward said surface;

means providing a timing signal indicative of the anticipated time of arrival of a reflection of one of said pulses from a point on said surface coinciding with a point on a reference surface;

a clock oscillator;

means controlled by said timing signal and by said reflected pulse for passing a single polarity output from said clock oscillator during the interval separating said timing signal from said reflected pulse, the polarity of said output depending upon whether said timing signal or said reflected pulse is first applied thereto;

means for accumulating said single polarity clock oscillator output to provide an error signal; and means displaying said error signal to show the departure of a point on said surface from a coinciding point on said reference surface.

7. Apparatus as claimed in claim 6 wherein said display means is a cathode ray tube.

8. Apparatus as claimed in claim 7 with additional means for resolving said error signal into components parallel to and perpendicular to said reference surface, means for intensity modulating said cathode ray tube with said component perpendicular to said reference surface, and means for deflecting said cathode ray tube with said component parallel to said reference surface.

9. A mapping system for determining the contours of a surface, comprising means for determining the distance along a ray from a mapping point to the surface, means for determining the distance along said ray to a datum plane, means providing a signal indicative of the difference between said distances, means for scanning said surface to provide a plurality of said difference signals related to coordinates of said surface, at least a pair of storage means, means applying a difference signal to the first of said storage means during a current data interval and for retrieving from the other of said storage means a difference signal stored during an immediately preceding data interval, means operative upon retrieval of said difference signal from said other storage means for clearing the same and for interchanging its role with that of the first of said storage means, whence the signal to be retrieved during the next succeeding data interval is from said first storage means while the difference signal then being generated is applied to said other storage means, and means for displaying the difference signals retrieved from storage.

10. A mapping radar comprising means for scanning the surface to be mapped with pulses of energy to provide a signal indicative of the range to points on said surface, a reference generator providing a signal indicative of range to points situated upon a datum plane corresponding to scanned points on said surface, a clock oscillator, means receiving signals from said scanning means and from said reference generator for passing one polarity of pulses from said clock oscillator upon the application thereto of a signal from said scanning means prior to the application of a signal from said reference generator and for passing opposite polarity pulses from said clock oscillator upon the application thereto of a signal from said reference generator prior to the application of a signal from said scanning means;

means receiving signals from said scanning means and from said reference generator for terminating passage of said clock pulses upon the application thereto of signal from said scanning means or said reference generator last to appear; and means for displaying the departure of said scanned surface from said datum plane indicated by said passed clock pulses.

11. A radar as claimed in claim 10 with additionally, at least a pair of storage means, means supplying said passed clock pulses to said storage means in alternation and means reciprocating with said storage supply means for retrieving from storage for display information on the departure of points on said scanned surface from points on said datum plane.

References Cited by the Examiner

UNITED STATES PATENTS

| 2,822,537 | 2/1958 | Bartelink | 343—11 |
| 3,080,556 | 3/1963 | Breithaupt. | |
| 3,086,200 | 4/1963 | Altermann. | |
| 3,093,823 | 6/1963 | Reed. | |
| 3,119,106 | 1/1964 | Burtner et al. | |
| 3,142,057 | 7/1964 | Deri | 343—7.3 X |

CHESTER L. JUSTUS, *Primary Examiner.*